US011919023B2

(12) United States Patent
Bayat et al.

(10) Patent No.: US 11,919,023 B2
(45) Date of Patent: Mar. 5, 2024

(54) ATOMIZER AND A MESH THEREFOR

(71) Applicant: Philip Morris Products S.A., Neuchatel (CH)

(72) Inventors: Dara Bayat, Neuchatel (CH); Michel Bessant, Neuchatel (CH); Jerome Christian Courbat, Neuchatel (CH); Olivier Dubochet, Neuchatel (CH); Ivar Kjelberg, Neuchatel (CH); Philippe Niedermann, Peseux (CH); Pascal Andre Daniel Jean Pratte, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 17/055,286

(22) PCT Filed: May 16, 2019

(86) PCT No.: PCT/EP2019/062717

§ 371 (c)(1),
(2) Date: Nov. 13, 2020

(87) PCT Pub. No.: WO2019/219865

PCT Pub. Date: Nov. 21, 2019

(65) Prior Publication Data

US 2021/0197222 A1 Jul. 1, 2021

(30) Foreign Application Priority Data

May 16, 2018 (EP) .................................... 18172751

(51) Int. Cl.
*B05B 17/00* (2006.01)
*A24F 40/05* (2020.01)
*A24F 40/10* (2020.01)

(52) U.S. Cl.
CPC .......... *B05B 17/0638* (2013.01); *A24F 40/05* (2020.01); *A24F 40/10* (2020.01)

(58) Field of Classification Search
CPC ... A61M 2205/75; A61M 15/00; A24F 40/10; A24F 40/05; B05B 17/0638
See application file for complete search history.

(56) References Cited

U.S. PATENT DOCUMENTS 6,196,219 B1 3/2001 Hess et al.
6,405,934 B1 6/2002 Hess et al.
(Continued)

FOREIGN PATENT DOCUMENTS

EP 1 005 917 A1 6/2000
EP 1 129 741 A2 9/2001
(Continued)

OTHER PUBLICATIONS

International Search Report and Written Opinion dated Jul. 29, 2019 in PCT/EP2019/062717 filed May 16, 2019.
(Continued)

*Primary Examiner* — Christopher R Dandridge
(74) *Attorney, Agent, or Firm* — Oblon, McClelland, Maier & Neustadt, L.L.P.

(57) ABSTRACT

A mesh for an atomizer assembly is provided, including a first surface, a second surface, and a plurality of nozzles extending between the first surface and the second surface, the first surface being at least partially coated with a hydrophilic coating or the second surface being at least partially coated with a hydrophobic coating, the plurality of nozzles defining an inner surface, and the inner surface being at least partially coated with the hydrophilic coating. An atomizer assembly for an aerosol-generating device, and an aerosol-generating device comprising an atomizer assembly, are also provided.

10 Claims, 2 Drawing Sheets

(56) References Cited

U.S. PATENT DOCUMENTS

| | | | | |
|---|---|---|---|---|
| 2009/0159728 | A1* | 6/2009 | Suzuki | F02M 61/1813 239/584 |
| 2011/0315786 | A1* | 12/2011 | Kambayashi | B05B 17/0646 239/102.2 |
| 2013/0299607 | A1* | 11/2013 | Wilkerson | A61M 15/025 239/328 |
| 2017/0251727 | A1 | 9/2017 | Nielsen | |

FOREIGN PATENT DOCUMENTS

| | | | |
|---|---|---|---|
| JP | 2008-168222 | A | 7/2008 |
| JP | 2008-229356 | A | 10/2008 |
| RU | 2 349 392 | C2 | 3/2009 |
| RU | 2016 105 522 | A | 8/2017 |
| WO | WO 2017/076590 | A1 | 5/2017 |

OTHER PUBLICATIONS

Decision to Grant and Search Report dated Sep. 15, 2022 in Russian Patent Application No. 2020141195/05(076729) (with English language translation), 21 pages.
Japanese Office Action dated Mar. 1, 2023 in Japanese Patent Application No. 2020-558615 (with English translation), 9 pages.
Chinese Office Action dated Nov. 23, 2023 issued in Chinese Patent Application No. 201980026955.5 filed May 16, 2019, with English Translation, total 11 pages.

* cited by examiner

ATOMIZER AND A MESH THEREFOR

The present invention relates to a mechanical atomizer with a vibrating mesh. More particularly, the invention relates to an atomizer with a passive mesh.

An aerosol-generating device with an atomizer and a passive mesh comprises a source of liquid (for example a liquid cartridge), a power source (for example a battery), and an atomizer. The atomizer comprises a vibrator system (for example piezoelectric), a vibrating element, a mesh with plurality of nozzles, and a liquid chamber enclosed by the mesh and the vibrating element.

In a passive mesh system, the mesh is an element which is not actuated to vibrate and not designed to vibrate. The vibrating element is actuated by the vibrator system, so that the vibrating element vibrates in a direction substantially transversal to the plane defined by the vibrating element. The liquid from the liquid chamber is in contact with both the vibrating element and the mesh. The vibrations of the vibrating element push periodically upon the liquid, which causes the liquid to move towards and away from the mesh. By moving the liquid towards the mesh, the liquid is pushed through the nozzles provided in the mesh. By subsequent moving the liquid away from the mesh, the droplets are formed. The mesh thus generates aerosol.

The currently available atomizers do not allow to produce droplets which have a diameter below 3 μm. If the viscosity of the liquid is substantially higher than the viscosity of water (e.g. 10 times higher than the viscosity of water), it is not possible to produce droplets which have a diameter below 5 μm.

For an improved nicotine delivery, the droplet size should be below 3 μm. A reduced droplet size is not achieved simply by reducing the diameter of the nozzles below 3 μm, because reducing the nozzle diameter usually does not lead to the desired droplet diameter.

There is provided a mesh for an atomizer assembly. The mesh may comprise a first surface and a second surface. A plurality of nozzles may extend between the first surface and the second surface. The first surface may be at least partially coated with a hydrophilic coating or the second surface may be at least partially coated with a hydrophobic coating.

According to the first aspect of the present invention, a mesh for an atomizer assembly is provided. The mesh comprises a first surface and a second surface, and a plurality of nozzles extending between the first surface and the second surface. The first surface is at least partially coated with a hydrophilic coating or the second surface is at least partially coated with a hydrophobic coating. The nozzles define an inner surface and said inner surface is at least partially coated with a hydrophilic coating.

As used herein, the term 'droplet diameter' means the diameter determined as mass median aerodynamic diameter (MMAD). Mass median aerodynamic diameter (MMAD) is used to mean the diameter of a sphere of unit density that has the same aerodynamic properties as a droplet of median mass from the aerosol.

The mass median aerodynamic diameter (MMAD) of the droplets generated using the mesh according to the first aspect of the present invention may be less than 3 μm, for example between about 0.1 μm and about 3 μm. The MMAD of the droplets generated using the mesh according to the first aspect of the present invention may be between about 0.1 μm and 2.8 μm, for example between 0.1 μm and 2.5 μm or between 0.1 μm and 2 μm. The MMAD of the droplets generated using the mesh according to the first aspect of the present invention may be between about 0.6 μm and 1 μm, for example equal to or about 0.8 μm. The desired droplet size of the droplets generated using the mesh according to the first aspect of the present invention may be any MMAD described above.

An aerosol-forming liquid used for aerosol generation in an atomizer comprising a mesh according to the first aspect of the invention may have a viscosity in a range between 1 mPas (millipascal second, mPa·s) and 100 mPas. The liquid may have a viscosity between 15 mPas and 90 mPas, for example between 17 mPas and 86 mPas. The liquids having viscosity as described above allow a wider range of flavours and liquid compositions to be used.

As used herein, a 'mesh' describes an element which is suitable for use in an atomizer assembly. The mesh is a flat element defining two surfaces and a plurality of nozzles through which fluid (for example, liquid) can travel from one surface to the other. Flat element means that the mesh has one of its dimensions (thickness) substantially smaller than the other two dimensions. The mesh thus defines two surfaces.

The mesh may be square shaped. The side of the square may be about 3 mm long. The side of the square may be about 2 mm long. The mesh may be circular. The diameter of the circle may be about 2 mm. The thickness of the mesh may be between 10 μm and 0.5 mm. The thickness of the mesh has to be selected with regards to the pressure inside of the device, the required durability of the mesh, and the required length of the nozzles. A thicker mesh is more durable, i.e. more able to withstand mechanical stress. However, the thicker the mesh is, the more increased is the pressure in the device, and the pressure exerted on the mesh.

The first surface may be at least partly coated with a hydrophilic coating. The second surface may be at least partly coated with a hydrophobic coating. In this context, 'at least partly' means that a specific percentage of the surface area is coated with the coating, the percentage being less than 100%. For example, at least 20% of the surface is coated, at least 50% of the surface is coated, at least 80% of the surface is coated, or at least 95% of the surface is coated. In an embodiment, the whole surface is coated.

A mesh is provided with a plurality of nozzles. As used herein, a 'nozzle' describes a through hole which allows the first surface to be in fluid communication with the second surface. The nozzles extend through the thickness of the material from which the mesh is made, and have a first opening in the first surface and a second opening in the second surface.

The nozzles may be tubular. The openings of the nozzles may be circular, elliptic, or any other suitable shape. The first opening of each nozzle may be wider than the second opening of the nozzle. The nozzles may be tapered towards the second opening. The nozzles may be triangular in cross section. The nozzles may be cylindrical, parabolic or hyperbolic. The nozzles may be rotationally symmetric.

The second opening of a nozzle may have a diameter of 0.1 μm to 10 μm. The second opening of a nozzle may have a diameter of 1 μm to 10 μm. The second opening of a nozzle may have a diameter of 2.5 μm to 4 μm. The diameter range of 2.5 μm to 4 μm is preferred, because it allows production of droplets below 3 μm.

The nozzles may be provided distributed evenly over the mesh in a periodical or quasi-periodical pattern. The nozzles may be provided in separate areas distributed periodically or quasi-periodically over the mesh, with each of the separate areas having one or more periodical or quasi-periodical mesh patterns. The nozzles may be distributed randomly over the mesh. In case where the nozzles are distributed randomly, there may be a guaranteed minimum of nozzles per unit of area of the mesh.

In case the nozzles are provided in separate areas, only the areas with the nozzles may be coated in the hydrophilic and/or hydrophobic coating. The nozzle-free areas may be left uncoated.

The nozzles define an inner surface between the first opening and the second opening. The inner surface may be coated in a hydrophilic material. The hydrophilic material coating the inner surface of the nozzles may be the same material as the material coating the first surface. The hydrophilic material coating the inner surface of the nozzles may be a different material from the material coating the first surface.

A hydrophobic surface has a contact angle θ larger than 90 degrees. A contact angle θ of hydrophobic surfaces is typically between 90 degrees and 120 degrees (a droplet beads up). Contrary to hydrophobicity, on a hydrophilic surface a water droplet spreads out far and the contact angle θ is very small. On these surfaces, the water droplets do not roll, but glide.

The hydrophobic and/or hydrophilic coatings are selected in view of stability of the coating to ensure that no degradation of the coating due to an increased temperature or mechanical stress occurs. The hydrophobic and/or hydrophilic coatings are selected in view of stability of the coating to ensure that no chemical reaction with for example tobacco, nicotine based liquid and the aerosol generated in the device occurs.

Coatings may be applied by chemical surface modification or physical deposition such as vacuum deposition and plasma surface treatment. Coatings may be applied to an underlying base material by methods known in the art for deposition of thin films. Chemical or physical deposition methods may be used. For example, a coating material may be directly sprayed on a surface of a material to be coated or dip coating of the material to be coated may be performed. More durable surface treatments are, for example, physical vapour deposition (PVD), chemical vapour deposition (CVD), self-assembled monolayers (SAM), sol-gel processes and other deposition processes suitable for thin-film coating.

The hydrophobic coating may comprise either polyurethane (PU) or a super-hydrophobic metal such as a microporous metal or a metal mesh. The microporous metal or metal mesh may be functionalised with carbon chains to make the microporous metal or metal mesh super-hydrophobic. Exemplary super-hydrophobic metals include copper and aluminium.

The hydrophobic coating may be at least partially formed of either polyurethane (PU) or a super-hydrophobic metal layer such as micropore metal or mesh metal. The micropore metal or mesh metal may be for example copper or aluminium, functionalised with carbon chains to make them super-hydrophobic. In other words, the super-hydrophobic metal layer may be a micropore metal functionalised with carbon chains to make it super-hydrophobic or a mesh metal functionalised with carbon chains to make it super-hydrophobic.

The hydrophilic coating may be at least partially formed of 3 polyamide, polyvinyl acetate (PVAc), cellulose acetate or cotton. The hydrophilic coating may be at least partially formed of hydrophilic oxides, for example one or more of the following group: $SiO_2$, $Al_2O_3$, $TiO_2$, $Ta_2O_5$.

The mesh may be made of silicon. In the manufacturing of the mesh, silicon-on-insulator wafers may be used. In an example manufacturing process of the mesh, the silicon is cleaned with an acid-based clean, such as RCA clean. The surface is thus oxidized and therefore made hydrophilic. In another example manufacturing process, the silicon can be oxidized thermally, coated with a thin oxide layer, for example one or more of the following: $SiO_2$, $Al_2O_3$, $TiO_2$, $HfO_2$, or other metal or non-metal oxide. The silicon may be also coated by sputter coating, atomic layer deposition (ALD), or molecular layer deposition (MVD).

An atomizer using the mesh according to the present invention comprises the mesh, an elastic element, an actuator and cavity between the mesh and the elastic element. The cavity contains the liquid to be atomized. When positioned inside the atomizer, the mesh is placed in the atomizer such that the first surface faces the cavity and the second surface faces the outside of the cavity.

The atomizer assembly may then be actuated. The atomizer may be actuated at a resonant frequency. The resonant frequency is a function of one or more of the following: e-liquid viscosity (possibly lowered by increasing its temperature above room temperature and below 100 degrees Celsius); e-liquid surface tension; nozzle diameter and geometry; mesh thickness or rigidity; speed of droplet ejection; amplitude of actuation; atomizer assembly mechanical characteristics. The resonant frequency may be calculated based on a combination of the above factors.

With the mesh as described above, it is possible to achieve the formation of droplets the diameters of which are typically below 3 μm. To decrease the diameter of the droplets formed, the viscosity of the e-liquid may be lowered by increasing its temperature. To decrease the diameter of the droplets formed, an appropriate actuation frequency could be used, for example the resonant frequency as described above.

The coatings help formation of the droplets in the following way. The hydrophilic coating on the first surface and the inner surface of the nozzles makes it easier for the liquid to travel through the nozzles. The hydrophilic coating helps the liquid travel into and through the nozzle. Once the liquid reaches the second surface, the hydrophobic coating helps the liquid to separate from the second opening of the nozzle (i.e. from the nozzle outlet).

Using the mesh as described above, it is possible to achieve droplet diameter below 3 μm.

According to the second aspect of the present invention, an atomizer assembly for an aerosol-generating device is provided. The atomiser assembly comprises a mesh as described above in connection to the first aspect.

The assembly may further comprise an elastically deformable element; a cavity positioned between the mesh element and the elastically deformable element; a liquid inlet for providing a supply of liquid to be atomized to the cavity; and an actuator arranged to oscillate the elastically deformable element.

According to the third aspect of the present invention, an aerosol generating device is provided. The aerosol generating device comprises an atomizer assembly as described in connection to the second aspect of the invention.

Specific embodiments of the present invention will now be described, by way of example only, with reference to the accompanying drawings in which:

FIGS. 1*a* and 1*b* are schematic overview of two embodiments of a mesh according to the present invention;

Figure 1A:
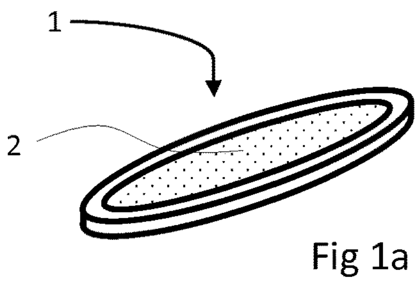
Figure 1B:
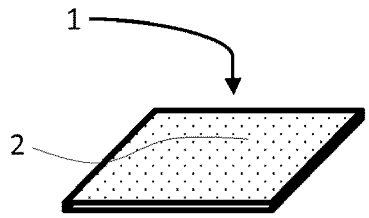
Figure 2:
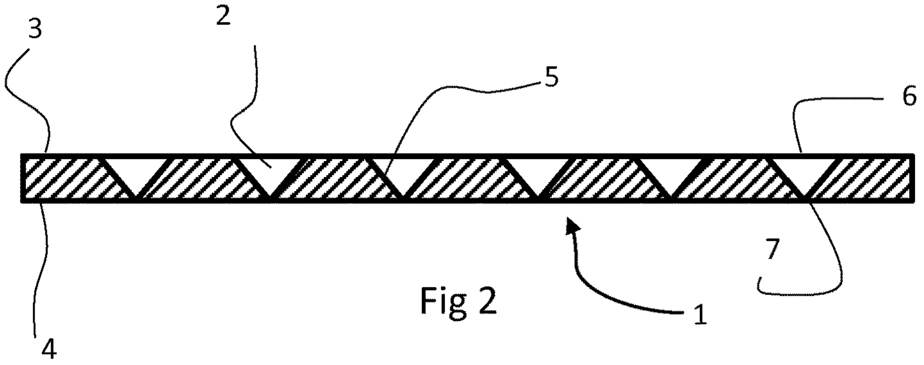
FIG. 2 is a schematic cross-sectional view of the mesh.

FIGS. 1*a*, 1*b* and 2 show an example of the mesh 1 according to the present invention. The mesh on FIG. 1*a* is circular, with a central part with nozzles 2 and a rim without nozzles. FIG. 1*b* shows a square-shaped mesh 1 with nozzles 2. The shape of the mesh and whether the rim is provided or not depends on the atomizer and on the way the mesh is retained in the atomizer.

The mesh comprises a plurality of nozzles 2. The nozzles 2 are triangle shaped, with their first opening 6 bigger than their second opening 7, as shown schematically in FIG. 2. The mesh 1 has a first surface 3 which, when positioned within the atomizer assembly 50, is positioned towards the cavity 62 containing the liquid, and a second surface 4 which, when positioned within the atomizer assembly, is positioned away from the cavity 62 containing the liquid.

Each of the nozzles 2 comprises a first opening 6, through which the liquid enters the nozzle 2, a second opening 7 through which the liquid leaves the nozzle 2, and an inner surface 5 which connects the first opening 6 with the second opening 7.

The first surface 3 is coated with a hydrophilic coating (not shown). The hydrophilic coating is any one of 3 polyamide, polyvinyl acetate, cellulose acetate or cotton.

The second surface 4 is coated with a hydrophobic coating. The hydrophobic coating comprises any one of polyurethane (PU) or a layer of a super-hydrophobic metal such as a microporous metal or a metal mesh. The microporous metal or metal mesh include copper or aluminium, functionalised with carbon chains.

The inner surface 5 of each nozzle is also coated with a hydrophilic coating. The hydrophilic coating is the same as the coating of the first surface.

Figure 3:
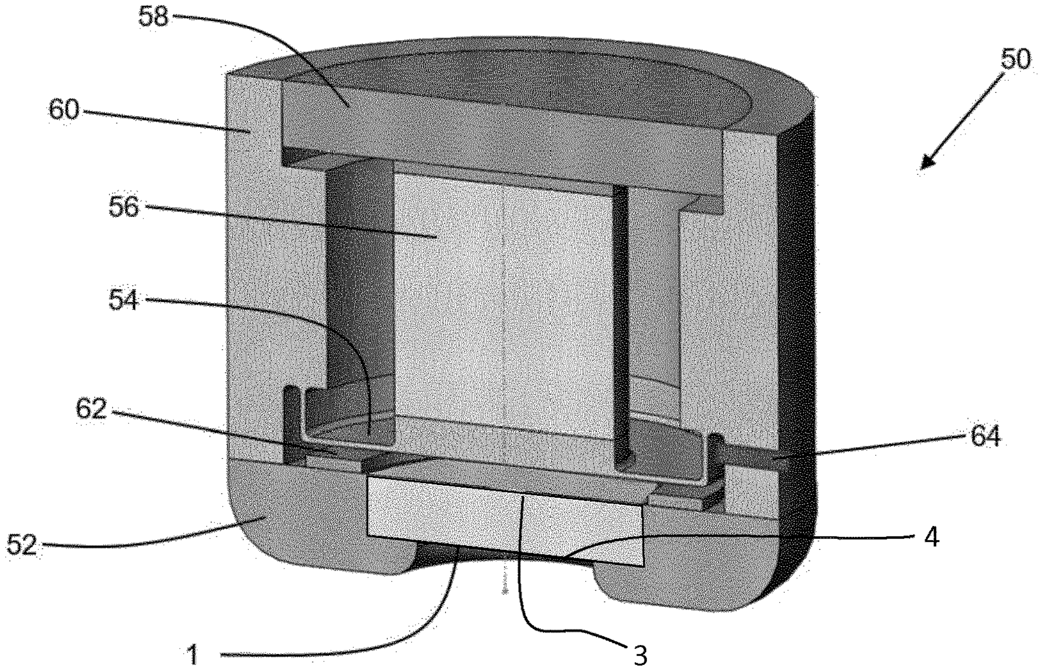
FIG. 3 is a schematic illustration of an atomizer assembly using the mesh.

FIG. 3 shows a perspective cross-sectional view of an atomiser assembly 50 comprising the mesh 1 of FIGS. 1 and 2. The mesh 1 is received within a mesh housing 52. The atomiser assembly 50 also comprises an elastically deformable element 54 and an actuator 56 arranged to oscillate the elastically deformable element 54. The actuator 56 is a piezoelectric actuator.

The atomiser assembly 50 also comprises a pre-loading element 58 arranged to compress the actuator 56 between the pre-loading element 58 and the elastically deformable element 54. The pre-loading element 58, the actuator 56 and the elastically deformable element 54 are arranged within an actuator housing 60. The actuator housing 60 is attached to the mesh housing 52 to define a cavity 62 between the mesh 1 and the elastically deformable element 54. The actuator housing 60 defines a liquid inlet 64 for providing a supply of liquid to be atomised to the cavity 62.

During use, liquid to be atomised is supplied to the cavity 62 through the liquid inlet 64. The actuator 56 oscillates the elastically deformable element 54 to force at least some of the liquid within the cavity 62 through the channels 14 and the nozzles 2 of the mesh 1. The liquid forced through the nozzles 18 of the mesh 1 form droplets. The momentum of the liquid forced through the nozzles 18 to form the droplets carries the droplets away from the mesh 1. Therefore, during use, the atomiser assembly 50 generates an aerosol comprising liquid droplets ejected through the mesh 1.

The atomizer may be actuated at a resonant frequency. The resonant frequency is a function of one or more of the following: e-liquid viscosity (possibly lowered by increasing its temperature above room temperature and below 100 degrees Celsius); e-liquid surface tension; nozzle diameter and geometry; mesh thickness or rigidity; speed of droplet ejection; amplitude of actuation; atomizer assembly mechanical characteristics. The resonant frequency may be calculated based on a combination of the above factors.

Figure 4:
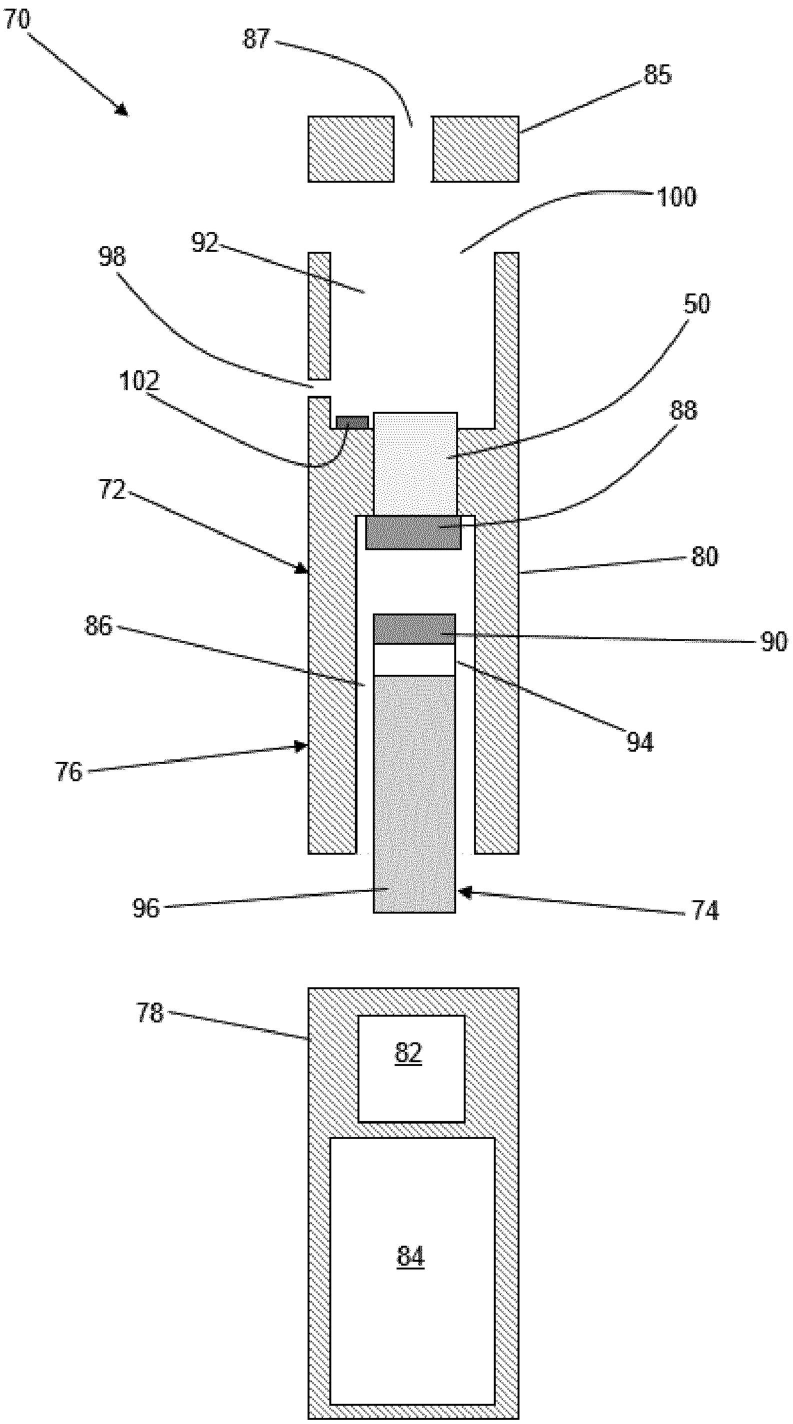
FIG. 4 is a schematic illustration of an aerosol generating device using the mesh.

FIG. 4 shows a cross-sectional view of an aerosol-generating system 70 according to an embodiment of the present invention. The aerosol-generating system 70 comprises an aerosol-generating device 72 and a liquid reservoir 74.

The aerosol-generating device 72 comprises a housing 76 comprising a first housing portion 78 and a second housing portion 80. A controller 82 and a power supply 84 comprising a battery are positioned within the first housing portion 78. A mouthpiece 85 defining a mouthpiece channel 87 is connectable to the second housing portion 80.

The second housing portion 80 defines a liquid reservoir chamber 86 for receiving the liquid reservoir 74. The first housing portion 78 is detachable from the second housing portion 80 to allow replacement of the liquid reservoir 74.

The aerosol-generating device 72 also comprises a device connector 88 positioned within the liquid reservoir chamber 86 for engagement with a reservoir connector 90 that forms part of the liquid reservoir 74.

The aerosol-generating device 72 comprises the atomiser assembly 50 of FIG. 3 positioned within the second housing portion 80. The liquid inlet 64 of the atomiser assembly 50 is in fluid communication with the device connector 88. The mesh 1 of the atomiser assembly 50 is positioned within an aerosol chamber 92 defined by the second housing portion 80.

The liquid reservoir 74 comprises a container 94 and a liquid aerosol-forming substrate 96 positioned within the container 94. When the reservoir connector 90 is engaged with the device connector 88, liquid aerosol-forming substrate 96 from the liquid reservoir 74 is supplied to the cavity 62 of the atomiser assembly 50 through the reservoir connector 90, the device connector 88, and the liquid inlet 64 of the atomiser assembly 50.

When the first housing portion 78 is connected to the second housing portion 80, the controller 82 controls a supply of power from the power supply 84 to the actuator 56 to eject droplets of the liquid aerosol-forming substrate 96 into the aerosol chamber 92 from the mesh 1.

The second housing portion 80 defines an air inlet 98 and an air outlet 100 each in fluid communication with the aerosol chamber 92. During use, a user draws on the mouthpiece 85 to draw air into the aerosol chamber 92 through the air inlet 98. The air flows through the aerosol chamber 92 where droplets of liquid aerosol-forming substrate 96 ejected from the mesh 1 are entrained within the airflow to form an aerosol. The aerosol flows out of the aerosol chamber 92 through the air outlet 100 and is delivered to the user through the mouthpiece channel 87.

The aerosol-generating device 72 also comprises an airflow sensor 102 positioned within the aerosol chamber 92. The airflow sensor 102 is arranged to provide a signal to the controller 82 indicative of a user drawing on the mouthpiece 85. The controller 82 is arranged to supply power from the power supply 84 to the actuator 56 of the atomiser assembly 50 only when the controller receives a signal from the airflow sensor 102 indicative of a user drawing on the mouthpiece 85.

The invention claimed is:

1. An atomizer assembly for an aerosol-generating device, the atomizer assembly comprising:

a mesh, comprising:

a first surface, a second surface, and a plurality of nozzles extending between the first surface and the second surface, wherein the second surface is at least partially coated with a hydrophobic coating, wherein the plurality of nozzles defines an inner surface, wherein the inner surface is at least partially coated with the hydrophilic coating, wherein each nozzle comprises a first opening in the first surface and a second opening in the second surface, wherein the first opening is wider than the second opening and the second opening has a diameter of 2.5 μm to 4 μm, and an elastically deformable element;

a cavity disposed between the mesh and the elastically deformable element;

a liquid inlet configured to provide a supply of liquid to be atomized to the cavity; and an actuator configured to oscillate the elastically deformable element, wherein the mesh is disposed such that the first surface of the mesh faces the cavity and the second surface of the mesh faces an outside of the atomizer assembly.

2. The mesh for an atomizer assembly according to claim 1, wherein the first surface is at least partially coated with a hydrophilic coating and the second surface is at least partially coated with a hydrophobic coating.

3. The mesh for an atomizer assembly according to claim 1, wherein the whole surface of the first surface, the second surface, or both the first and the second surfaces is coated.

4. The mesh for an atomizer assembly according to claim 1, wherein the hydrophobic coating comprises polyurethane or a super-hydrophobic metal layer or a combination of both.

5. The mesh for an atomizer assembly according to claim 4, wherein the super-hydrophobic metal layer comprises a microporous metal functionalised with carbon chains or a metal mesh functionalised with carbon chains.

6. The mesh for an atomizer assembly according to claim 1, wherein the hydrophilic coating comprises at least one of the following: oxides, 3 polyamide, polyvinyl acetate, cellulose acetate, cotton.

7. The mesh for an atomizer assembly according to claim 1, wherein the hydrophilic coating comprises at least one of the following: $SiO_2$, $Al_2O_3$, $TiO_2$, $Ta_2O_5$, $HfO_2$.

8. The mesh for an atomizer assembly according to claim 1, wherein the mesh is made of silicon.

9. The mesh for an atomizer assembly according to claim 1, wherein each nozzle of the plurality of nozzles defines a first opening in the first surface and a second opening in the second surface, and wherein the second opening has a diameter of 2.5 μm to 4 μm.

10. An aerosol generating device comprising an atomizer assembly according to claim 1.

* * * * *